US010864881B2

United States Patent
Park et al.

(10) Patent No.: US 10,864,881 B2
(45) Date of Patent: Dec. 15, 2020

(54) SIDE AIRBAG DEVICE

(71) Applicant: HYUNDAI MOBIS CO., LTD., Seoul (KR)

(72) Inventors: Hae Kwon Park, Yongin-si (KR); Jiwoon Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 81 days.

(21) Appl. No.: 16/137,541

(22) Filed: Sep. 21, 2018

(65) Prior Publication Data

US 2019/0092271 A1 Mar. 28, 2019

(30) Foreign Application Priority Data

Sep. 22, 2017 (KR) .................. 10-2017-0122252

(51) Int. Cl.
*B60R 21/231* (2011.01)
*B60R 21/207* (2006.01)
*B60R 21/2338* (2011.01)
*B60R 21/00* (2006.01)

(52) U.S. Cl.
CPC ...... *B60R 21/23138* (2013.01); *B60R 21/207* (2013.01); *B60R 21/2338* (2013.01); *B60R 2021/0006* (2013.01); *B60R 2021/0048* (2013.01); *B60R 2021/23146* (2013.01); *B60R 2021/23386* (2013.01)

(58) Field of Classification Search
CPC .......... B60R 21/23138; B60R 21/2338; B60R 21/207; B60R 2021/23386
See application file for complete search history.

(56) References Cited

U.S. PATENT DOCUMENTS

| | | | | |
|---|---|---|---|---|
| 5,813,696 A * | 9/1998 | Hill | ...................... | B60R 21/233 280/743.2 |
| 6,032,977 A * | 3/2000 | Reh | ....................... | B60R 21/233 280/729 |
| 7,648,161 B2 * | 1/2010 | Kai | ....................... | B60N 2/4221 280/730.2 |
| 8,360,469 B2 * | 1/2013 | Wiik | .................. | B60R 21/23138 280/730.2 |
| 8,684,408 B2 * | 4/2014 | Thomas | ................. | B60R 21/231 280/730.2 |
| 9,428,135 B1 * | 8/2016 | Thomas | ................. | B60R 21/207 |
| 10,486,638 B2 * | 11/2019 | Kwon | ................. | B60R 21/2338 |
| 10,543,800 B2 * | 1/2020 | Kwon | ................. | B60R 21/207 |
| 10,543,801 B2 * | 1/2020 | Kwon | ................. | B60R 21/2338 |
| 2013/0079208 A1 * | 3/2013 | Wiik | ..................... | B60R 21/237 493/405 |
| 2019/0092270 A1 * | 3/2019 | Song | ..................... | B60R 21/233 |
| 2019/0161045 A1 * | 5/2019 | Thomas | .............. | B60R 21/2338 |

* cited by examiner

Primary Examiner — Paul N Dickson
Assistant Examiner — Joselynn Y Sliteris
(74) Attorney, Agent, or Firm — H.C. Park & Associates, PLC

(57) ABSTRACT

A side airbag device may include: an inflator mounted to a seat frame; a cushion covering the inflator and configured to be deployed by gas discharged from the inflator to protect a side portion of an passenger; and a tether mounted to the inflator and configured to enclose the cushion and reduce collision energy applied to the passenger.

5 Claims, 5 Drawing Sheets

SIDE AIRBAG DEVICE

CROSS-REFERENCES TO RELATED APPLICATION

This application claims priority from and the benefit of Korean Patent Application No. 10-2017-0122252, filed on Sep. 22, 2017, which is hereby incorporated by reference for all purposes as if set forth herein.

BACKGROUND

Field

Exemplary embodiments relate to a side airbag device, and more particularly, to a side airbag device capable of preventing collision between occupants, and protecting an occupant even when only the single occupant sits on a seat.

Discussion of the Background

In general, a side airbag protects a side portion of an occupant. In other words, when a vehicle is involved in an accident, an airbag cushion is inflated by supplied gas, and the inflated airbag cushion protects, by cushioning, an occupant who moves sideways.

Side airbags are classified into a near side airbag which is deployed between an occupant and a door to protect the occupant when a side collision occurs, and a far side airbag configured to restrain movement of the occupant who moves toward the inside of the vehicle due to reaction force generated by the side collision.

The far side airbag is required to be retained at a predetermined position after having inflated, so as to prevent a collision between occupants, particularly, a collision between the heads of the occupants.

In the conventional art, although the far side airbag may be effectively used in the case where two occupants sit on seats, it may not effectively protect an occupant in the case where only the single occupant sits on a seat. Therefore, there is a need to improve this configuration.

The above information disclosed in this Background section is only for enhancement of understanding of the background of the invention and, therefore, it may contain information that does not constitute prior art.

SUMMARY

Exemplary embodiments of the present invention are directed to an airbag apparatus capable of preventing a collision between occupants, and also protecting an occupant even when only the single occupant sits on a seat.

In one embodiment, a side airbag device may include: an inflator mounted to a seat frame; a cushion covering the inflator and configured to be deployed by gas discharged from the inflator to protect a side portion of an occupant; and a tether mounted to the inflator and configured to enclose the cushion and reduce collision energy of the occupant.

The inflator may include: a discharger configured to provide gas when a vehicle collision occurs; and a connector configured to mount the discharger to the seat frame.

The cushion may include: a cushion deployment part mounted to the inflator and configured to be deployed by gas discharged from the inflator; a cushion passing part formed in the cushion deployment part so that the tether passes through the cushion passing part; and a cushion penetration part formed in an upper end of the cushion deployment part so that the tether penetrates the cushion penetration part.

The tether may include: a first tether fixed to the inflator, disposed on the inner side surface of the cushion deployment part, and reaching the cushion passing part; a second tether extending from the first tether, reaching the cushion penetration part via the cushion passing part, and disposed on the outer side surface of the cushion deployment part; and a third tether extending from the second tether, disposed on the inner side surface of the cushion deployment part, and fixed to the inflator and configured to support the occupant.

A length of the tether may be less than a length an installation path of the tether.

A medial portion of the tether may have a width greater than or equal to a width of each end of the tether.

The third tether may have a width greater than or equal to a width of the first tether.

The third tether may have a width greater than or equal to a width of the second tether.

In a side airbag device in accordance with the present invention, a tether formed to enclose a cushion may reduce collision energy of an occupant.

In the side airbag device in accordance with the present invention, the tether may enclose the cushion while passing through the cushion, and may induce an upper portion of the cushion to be inclined toward the occupant.

In the side airbag device in accordance with the present invention, when a vehicle collision occurs, the head of the occupant comes into contact with the tether so that impact may be absorbed, and the tether may slide by the head of the occupant and induce the upper portion of the cushion to enclose the head of the occupant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

Figure 1:
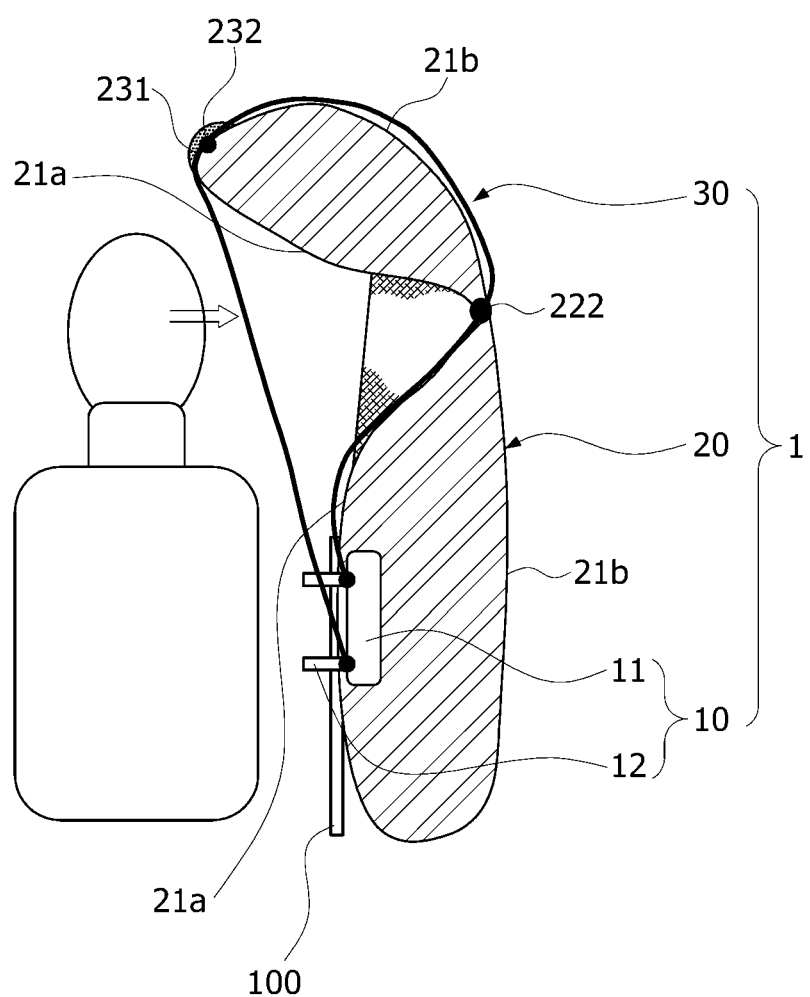
FIG. 1 is a diagram schematically illustrating a side airbag device in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

FIG. 1 is a diagram schematically illustrating a side airbag device in accordance with an embodiment of the present invention. Referring to FIG. 1, the side airbag device 1 in accordance with the embodiment of the present invention includes an inflator 10, a cushion 20, and a tether 30.

The inflator 10 is mounted on a seat frame 100. For example, the seat frame 100 may be made of metal and covered with a seat cushion to allow an occupant to sit thereon. A vehicle includes various seats such as a driver's seat and a passenger seat. The inflator 10 may be installed on each of the seat frames 100 corresponding to the respective seats. Alternatively, the inflator 10 may be selectively installed.

The cushion 20 covers the inflator 10, and may be deployed by gas discharged from the inflator so as to protect a side portion of the occupant. For example, the cushion 20 coupled to the inflator 10 may be folded and housed in the seat cushion before gas is discharged from the inflator 10, and may be deployed when gas is discharged from the inflator 10, and then protrude out of the seat cushion.

The tether 30 may be mounted to the inflator 10 and formed to enclose the cushion 20, and may function to reduce collision energy of the occupant. For example, opposite ends of the tether 30 may be fixed to the inflator 10. The tether 30 may be formed to enclose an outer surface of the cushion 20, and may function to guide the cushion 20 such that an upper part of the cushion 20 encloses the head of the occupant.

The inflator 10 in accordance with the embodiment of the present invention includes a discharger 11 and a connector 12.

The discharger 11 provides gas when a vehicle collision occurs. For example, when a vehicle collision is sensed, a sensing signal is transmitted to the discharger 11 so that gas is discharged from the discharger 11.

The connector 12 mounts the discharger 11 to the seat frame 100. For example, a plurality of connectors 12 may be coupled to the seat frame 100 by bolting to fix the discharger 11 to the seat frame 100.

Figure 2:
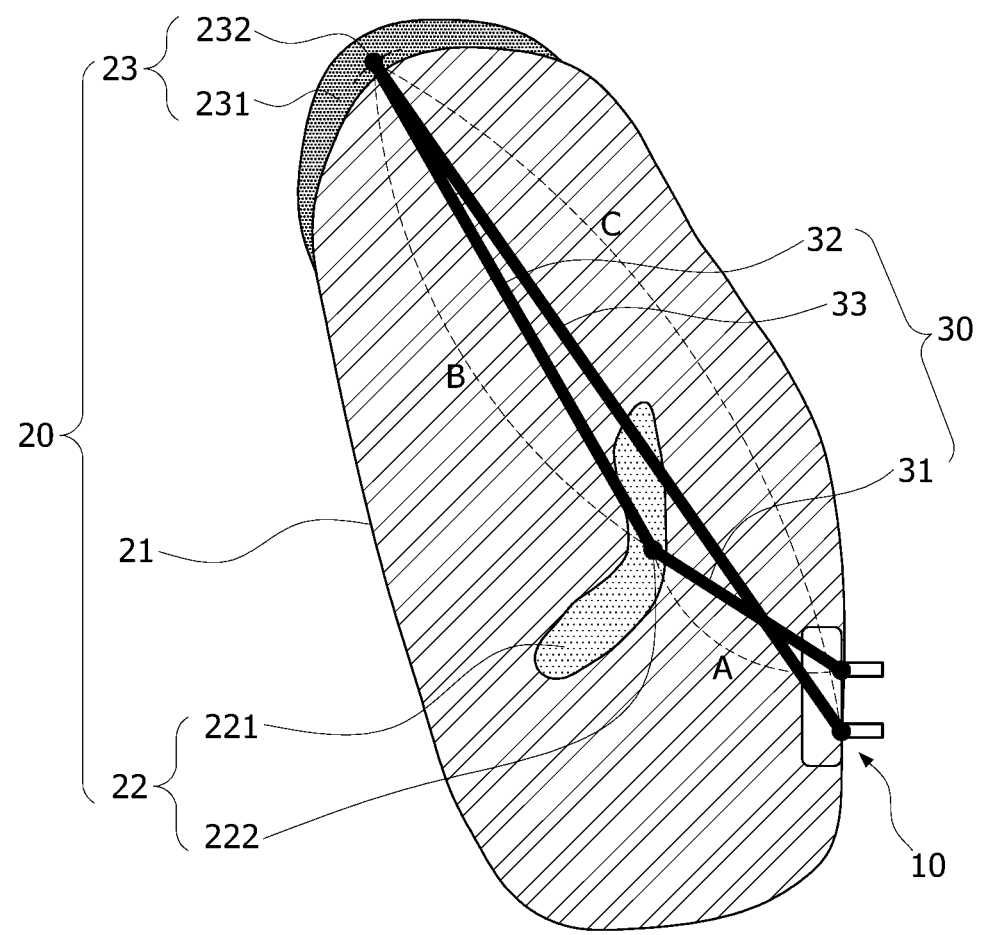
FIG. 2 is a diagram schematically illustrating a deployed state of a cushion of the side airbag device in accordance with the embodiment of the present invention.
Figure 3:
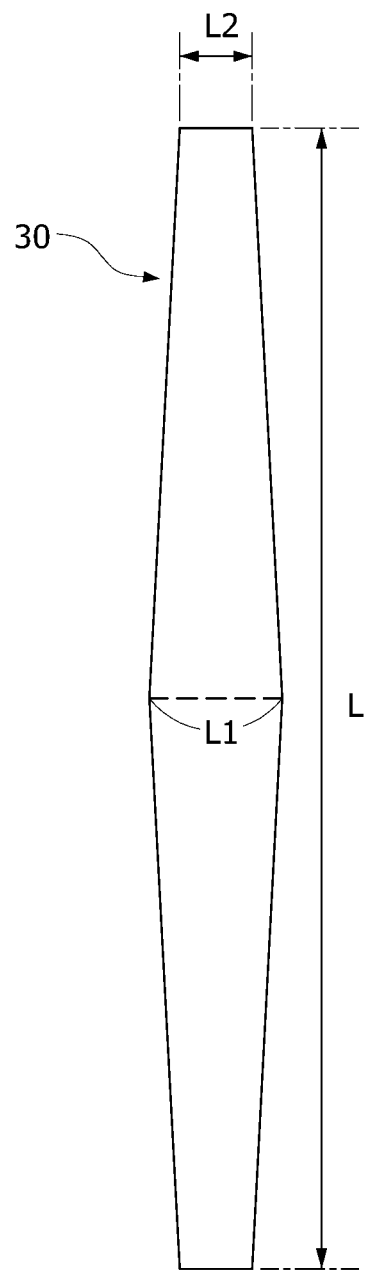
FIG. 3 is a diagram schematically illustrating a tether of the side airbag device in accordance with the embodiment of the present invention.

FIG. 2 is a diagram schematically illustrating a deployed state of the cushion of the side airbag device in accordance with the embodiment of the present invention, and FIG. 3 is a diagram schematically illustrating the tether of the side airbag device in accordance with the embodiment of the present invention.

Referring to FIGS. 1 to 3, the cushion 20 in accordance with the embodiment of the present invention includes a cushion deployment part 21, a cushion passing part 22, and a cushion penetration part 23.

The cushion deployment part 21 is mounted to the inflator 10, and may be deployed by gas discharged from the inflator 10 and then disposed on a side of the occupant. For example, the cushion deployment part 21 may be coupled to the discharger 11 and configured to be deployed. In addition, the cushion deployment part 21 may be coupled to the seat frame 100 and configured to be deployed. When the cushion deployment part 21 is deployed, the cushion deployment part 21 may be divided into an inner side surface 21a facing the occupant, and an outer side surface 21b disposed on an opposite side of the inner side surface 21a.

The cushion passing part 22 is formed in the cushion deployment part 21, and the tether 30 passes through the cushion passing part 22. For example, the cushion passing part 22 may be disposed at a position corresponding to the head of the occupant when the cushion deployment part 21 is completely deployed. The cushion deployment part 21 formed from the cushion passing part 22 as a start point to an upper end of the cushion deployment part 21 may protrude to enclose the head of the occupant. The cushion passing part 22 may include a passage joining part 221 which is formed in the cushion deployment part 21 and has a joined structure to prevent gas from being drawn thereinto, and a passing hole 222 which is formed in the passage joining part 221, and through which the tether 30 passes. The tether 30 is disposed from the inner side surface 21a side of the cushion deployment part 21 to the outer side surface 21b side by passing through the passing hole 222.

The cushion penetration part 23 is formed in the upper end of the cushion deployment part 21, and the tether 30 passes through the cushion penetration part 23. For example, the cushion penetration part 23 may include a penetration joining part 231 which is formed in the upper end of the cushion deployment part 21 and has a joined structure to prevent gas from being drawn thereinto, and a penetration hole 232 which is formed in the penetration joining part 231, and through which the tether 30 passes. The tether 30 is disposed from the outer side surface 21b side of the cushion deployment part 21 to the inner side surface 21a side by passing through the penetration hole 232.

Referring to FIGS. 1 to 3, the tether 30 in accordance with the embodiment of the present invention includes a first tether 31, a second tether 32, and a third tether 33. For example, the tether 30 may be formed of a single string, and include elastic material for shock absorption. Furthermore, the tether 30 may include soft material to prevent the occupant from being injured due to direct contact with the tether 30.

The first tether 31 is fixed to the inflator 10 and reaches the cushion passing part 22. The second tether 32 extends from the first tether 31, and reaches the cushion penetration part 23 via the cushion passing part 22. The third tether 33 extends from the second tether 32, and is fixed to the inflator 10 via the cushion penetration part 23. The third tether 33 functions to support the occupant.

The first tether 31 may be coupled at one end thereof to the connector 12, be disposed along the inner side surface 21a of the cushion deployment part 21, and reach the cushion passing part 22. The second tether 32 may pass through the cushion passing part 22 and be disposed along the outer side surface 21b of the cushion deployment part 21. The third tether 33 may pass through the cushion penetration part 23 and be disposed along the inner side surface 21a of the cushion deployment part 21. The third tether 33 may be coupled at one end thereof to the connector 12.

The length of the tether 30 is less than that of an installation path of the tether 30 before the deployment of the cushion 20. In more detail, when the length of the tether 30 is L, the distance from the connector 12 to the cushion passing part 22 is A, the distance from the cushion passing part 22 to the cushion penetration part 23 is B, and the distance from the cushion penetration part 23 to the connector 12 is C, A+B+C>L may be satisfied. Thereby, when the cushion deployment part 21 is completely deployed, the upper portion of the cushion deployment part 21 that is disposed over the cushion passing part 22 may be bent toward the occupant, and the tether 30 may be tensed.

In addition, the tether 30 is formed such that a medial portion thereof has a width greater than or equal to that of each end thereof. In more detail, when the width of the medial portion of the tether 30 is L1 and the width of each end of the tether 30 is L2, L1>L2 or L1=L2 may be satisfied. For example, the third tether 33 is formed to have a width greater than or equal to that of the first tether 31 and the second tether 32. If the third tether 33 is designed to have the largest width, the head of the occupant may stably make contact with the third tether 33.

Figure 4:
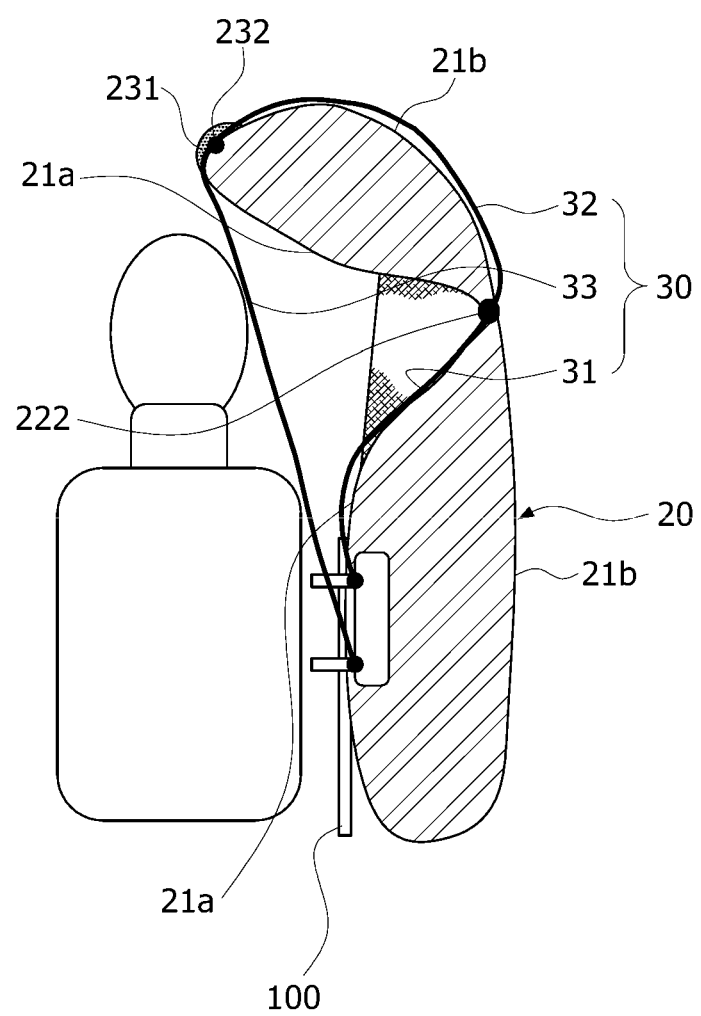
FIG. 4 is a diagram schematically illustrating a completely deployed shape of the cushion before an occupant is loaded on the side airbag device in accordance with the embodiment of the present invention.
Figure 5:
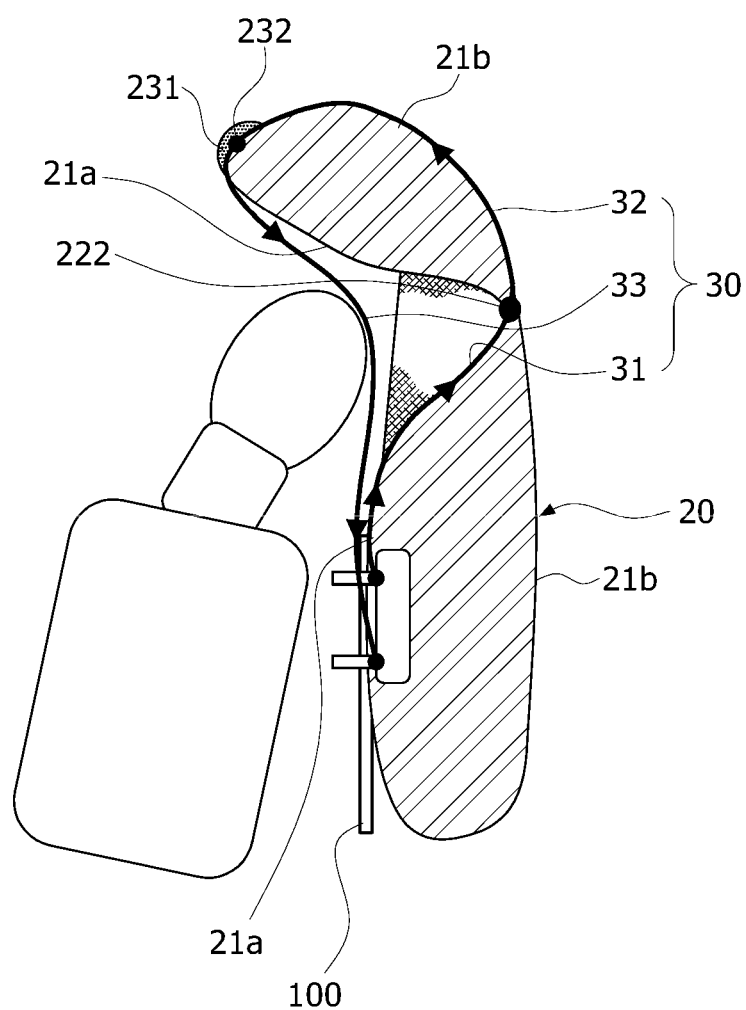
FIG. 5 is a diagram schematically illustrating an energy absorbing process when the occupant is loaded after the state of FIG. 4.

FIG. 4 is a diagram schematically illustrating a completely deployed shape of the cushion before the occupant is loaded on the side airbag device in accordance with the embodiment of the present invention, and FIG. 5 is a diagram schematically illustrating an energy absorbing process when the occupant is loaded after the state of FIG. 4. Hereinbelow, the operation of the side airbag device 1 will be described with reference to FIGS. 4 and 5.

If gas is discharged from the inflator 10 when a vehicle collision occurs, the cushion 20 is deployed. Here, the tether 30 passing through the cushion passing part 22 and the cushion penetration part 23 supports the circumference of the cushion deployment part 21. In detail, the first tether 31 is disposed on the inner side surface 21a of the cushion deployment part 21, the second tether 32 is disposed on the outer side surface 21b of the cushion deployment part 21, and the third tether 33 is disposed on the inner side surface 21a of the cushion deployment part 21. Due to the length of the tether 30, the upper end of the cushion deployment part 21 remains bent toward the head of the occupant (refer to FIG. 4).

In this state, if the occupant moves toward the cushion deployment part 21, the head of the occupant pushes the third tether 33. If the head of the occupant pushes the third tether 33, the entire tether 30 slides in a direction indicated by the arrows. As such, if the tether 30 slides, the tension applied to the tether 30 is increased, so that the upper end of the cushion deployment part 21 may be further inclined toward the occupant to enclose the head of the occupant. Thereby, the movement of the occupant may be controlled by an increased load, whereby displacement of the occupant may be effectively restrained. Particularly, since the cushion deployment part 21 encloses the head of the occupant, impact may be prevented from being applied to the head and the neck of the occupant.

As described above, in the side airbag device 1 in accordance with the embodiment of the present invention, the tether 30 is configured to enclose the cushion 20, whereby collision energy of the occupant may be markedly reduced.

Furthermore, in the side airbag device 1 in accordance with the embodiment of the present invention, the tether 30 encloses the cushion 20 while passing through the cushion 20, and thus is able to induce the upper portion of the cushion 20 to be bent toward the occupant.

In addition, in the side airbag device 1 in accordance with the embodiment of the present invention, when a vehicle collision occurs, the head of the occupant comes into contact with the tether 30 so that impact is absorbed, and the tether 30 slides by the head of the occupant and thus induces the upper portion of the cushion 20 to enclose the head of the occupant.

Although preferred embodiments of the invention have been disclosed for illustrative purposes, those skilled in the art will appreciate that various modifications, additions and substitutions are possible, without departing from the scope and spirit of the invention as defined in the accompanying claims. Therefore, the spirit and scope of the present invention should be defined by the accompanying claims.

What is claimed is:

1. A side airbag device comprising:
an inflator mounted to a seat frame;
a cushion covering the inflator and configured to be deployed by gas discharged from the inflator to protect a side portion of occupant passenger; and
a tether mounted to the inflator and configured to enclose the cushion and reduce collision energy applied to the passenger,
wherein:
the cushion comprises:
a cushion deployment part mounted to the inflator and configured to be deployed by gas discharged from the inflator;
a cushion passing part formed in the cushion deployment part so that the tether passes through the cushion passing part; and
a cushion penetration part formed in an upper end of the cushion deployment part so that the tether penetrates the cushion penetration part;
the tether comprises:
a first tether fixed to the inflator, disposed on an inner side surface of the cushion deployment part, and reaching the cushion passing part;
a second tether extending from the first tether, reaching the cushion penetration part via the cushion passing part, and disposed on an outer side surface of the cushion deployment part; and
a third tether extending from the second tether, disposed on the inner side surface of the cushion deployment part, and fixed to the inflator and configured to support the passenger;
the third tether has a width that is different from a width of the first tether and a width of the second tether; and
a medial portion of the tether has a width greater than a width of each end of the tether.

2. The side airbag device according to claim 1, wherein the inflator comprises:
a discharger configured to provide gas when a vehicle collision occurs; and
a connector configured to mount the discharger to the seat frame.

3. The side airbag device according to claim 1, wherein a length of the tether is less than a length of an installation path of the tether.

4. The side airbag device according to claim 1, wherein the width of the third tether is greater than the width of the first tether.

5. The side airbag device according to claim 1, wherein the width of the third tether is greater than the width of the second tether.

* * * * *